June 28, 1932.    J. H. OFFEN    1,864,853
CENTRIFUGAL GOVERNOR
Filed April 1, 1930    2 Sheets-Sheet 1
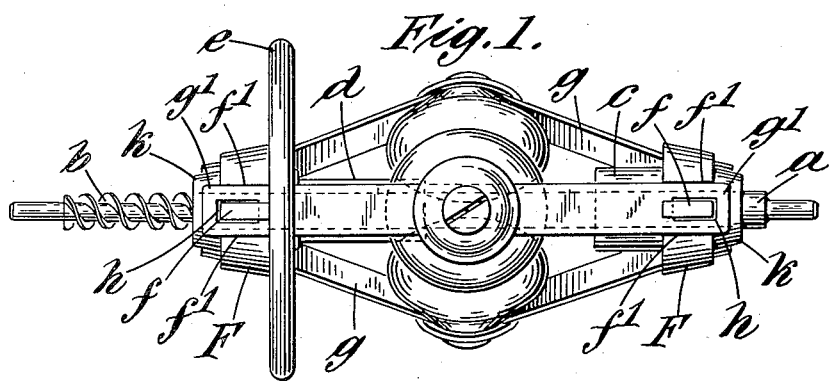
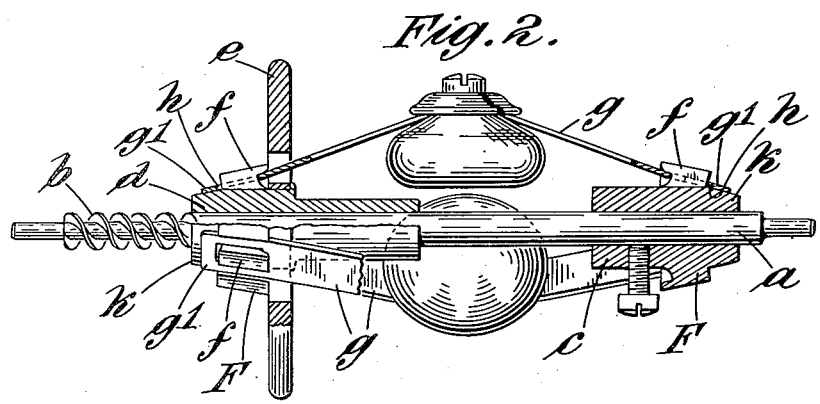
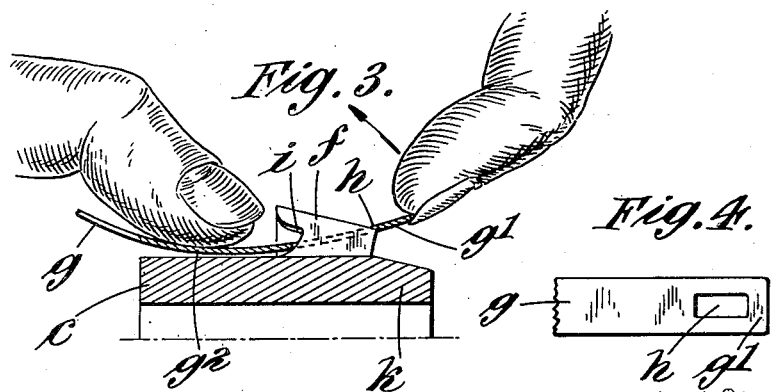
James Herbert Offen
Inventor,
per, Otto Munk
his Atty.

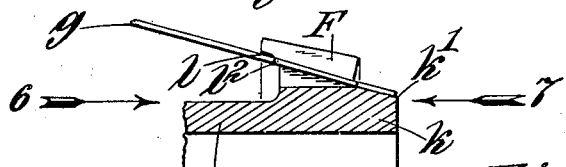
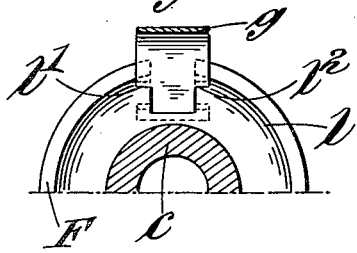
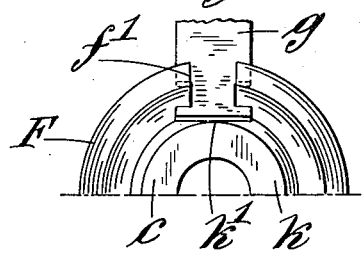
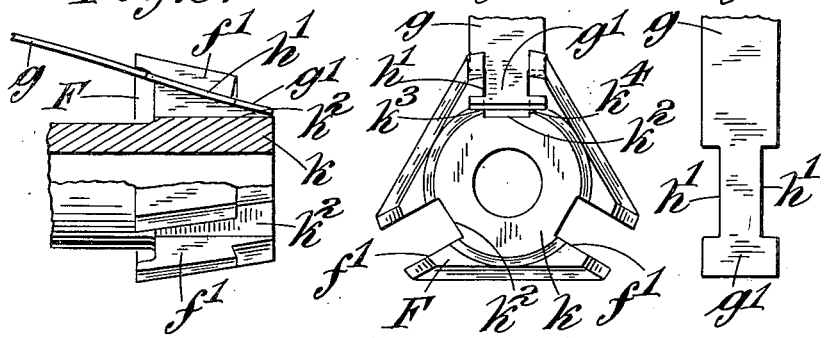
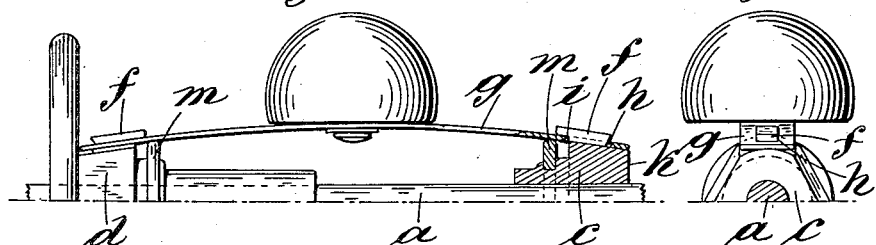

Patented June 28, 1932

1,864,853

UNITED STATES PATENT OFFICE

JAMES HERBERT OFFEN, OF SWINDON, ENGLAND, ASSIGNOR TO THE GARRARD ENGINEERING & MANUFACTURING COMPANY LIMITED, OF SWINDON, ENGLAND

CENTRIFUGAL GOVERNOR

Application filed April 1, 1930, Serial No. 440,695, and in Great Britain April 19, 1929.

This invention relates to improvements in centrifugal governors of that type usually employed with motors for rotating the tables of gramophones and similar purposes and has for its object the provision of means whereby the flexible and elastic members carrying the masses affected by centrifugal force may be connected to the abutment and to the movable part in a simpler, more effective and more reliable manner than has been possible hitherto, said improved means of connection enabling the said members to be associated with and dissociated from the remainder of the mechanism with great ease and facility thus enabling the cost of manufacture to be reduced.

In constructing governors of the type to which this invention relates and which comprise a driving spindle, a bush fixedly mounted on said spindle, a bush slidingly mounted on said spindle and having a friction surface, a plurality of flexible and elastic members, each of which is connected at one end to the fixed bush and at the other end to the slidingly mounted bush and a mass secured to each flexible and elastic member, it has been usual to secure the flexible and elastic members to the fixed bush and the sliding bush by means of screws or the like.

During mass production it has been found that great difficulty exists in obtaining, as articles of commerce, screws, the under surface of the heads of which are flat, and in forming accurate seatings on the bushes when said seatings are provided with tapped holes, with the result that when a screw is tightened in place with the end of an elastic member under the head, the elastic member is locally distorted or deformed. This local distortion or deformation introduces irregularity of performance of the governor, reduces its sensitivity, introduces a certain amount of lag and also delays the movement of the sliding bush owing to the friction introduced between the inner surface of the bore thereof and the external surface of the spindle upon which it slides.

A further disadvantage to the use of screws is that they are difficult to insert with rapidity, are easily lost when removed and are liable to be loosened during use by vibration and to drop out during rotation thus releasing an end of one of the elastic members which by flying outwards under the influence of centrifugal force, is liable to be damaged or to damage other parts struck thereby during its passage.

This invention consists in the arrangement of abutments on the fixed and sliding bushes for engagement with slots or notches in the ends of the flexible members, said abutments maintaining said flexible members in position securely without inadvertently introducing distortion of said members, parts of said abutments engaging with the flexible members in some cases so as to definitely flex said members a predetermined amount.

In the drawings:—

Figure 1 is a side elevation of an improved governor constructed in accordance with this invention;

Figure 2 is a view of the same construction illustrated in Figure 1 parts of the device being broken away or illustrated in section in order that the details may be clearly shown;

Figure 3 is a fragmentary view showing how the improved construction, forming the subject of the present invention, can be manipulated;

Figure 4 is a fragmentary view of one end of a flexible and elastic member for use in the construction illustrated in Figures 1, 2 and 3;

Figure 5 is a fragmentary view of an alternative construction in sectional elevation;

Figure 6 is an end elevation of Figure 5 looking in the direction of the arrow 6 in Figure 5;

Figure 7 is an end elevation of Figure 5 looking in the direction of the arrow 7 in Figure 5;

Figure 8 is a part sectional fragmentary elevation of a further modified construction;

Figure 9 is an end elevation of Figure 8;

Figure 10 is a fragmentary view of one end of a flexible and elastic member for use in the construction illustrated in Figures 5, 6, 7, 8 and 9;

Figure 11 is a fragmentary view illustrating the application of the invention to a centrifugal governor in which the rotating masses are mounted on that side of the flexible and elastic elements which is removed from the driving shaft; and Figure 12 is an end elevation of Figure 11.

As illustrated in Figures 1-10 the invention is applied to a centrifugal governor of that kind in which each mass is secured to the flexible and elastic member associated therewith on that side of the member which is in proximity with the surface of the spindle whereas the construction illustrated in Figures 11 and 12 has reference to the application of the invention to centrifugal governors of that kind in which each mass is secured with the flexible and elastic member associated therewith on that side of the member which is remote from the surface of the spindle.

The construction illustrated in Figure 1 comprises a spindle $a$ having the usual driving worm $b$, a fixed bush $c$ and a moving bush $d$ having a brake disc $e$. The fixed and sliding bushes $c$ and $d$ are provided with angularly disposed abutments $f$ each end of each of the flexible members $g$ being provided with a slot $h$ (see Figure 4) of sufficient length to enable it to be disposed over the said abutment $f$ when the angularity of the end is reversed as illustrated in Figure 3 and properly engage with said abutment $f$ when the member $g$ is in normal position as illustrated in Figure 2.

It will be seen on reference to Figure 3 that the abutment $f$ is provided with an undercut part or notch $i$ so as to enable the end $g^1$ of the member $g$ to be raised in the direction of the arrow by the finger when the part $g^2$ of said member is depressed and said member is longitudinally displaced by another finger, the length of the slots $h$ in the members $g$ being less than the overall length of the abutments $f$ but more than the distance between the surface of the undercut part $i$ and the corner of the abutment $f$ remote therefrom.

The abutments $f$ may be readily produced in the construction illustrated in Figures 1, 2 and 3 by providing the sliding and fixed bushes $d$ and $c$ respectively with flanges F having such profile that when the pairs of slots $f^1$ are cut therein the abutment $f$ remains.

In order to support the free ends of the members $g$ the bushes $c$ and $d$ are provided with conical extensions $k$ the angularity of said extensions being such that the free ends $g^1$ of the members $g$ rest thereon with only a small pressure when the governor is stationary.

In the construction illustrated in Figures 1 and 2 the brake disc $e$ is provided with apertures to allow the members $g$ to pass to the abutments $f$ but obviously this feature of construction is without importance to the present invention.

The construction illustrated in Figures 5, 6 and 7 is shown as applied to a fixed bush $c$ but obviously it may equally well be applied to a moving bush $d$. In this construction the flange F has only a single slot $f^1$ at three points, the flange is provided with a radius in the corner $l$ and the bush $c$ is provided with a conical extension $k$ at that side of the flange F remote from the radius $l$.

Each free end of the members $g$ is provided with two marginal notches $h^1$ oppositely arranged (see Figure 10) the material between the notches $h^1$ being equal in width to the width of the slots formed in the flanges F whilst the length of the notches $h^1$ is less than the width of the flanges F for reasons already explained in connection with the construction in Figures 1, 2 and 3.

With the construction illustrated in Figures 5, 6 and 7 it will be seen that each end of each member $g$ engages with a bush at three points, viz. the points $l^1$ and $l^2$ where the corners of the member $g$ engage with the radius $l$ (see Figures 6) and $k^1$ where the end of each member $g$ engages with the conical extension $k$ (see Figure 7).

In the construction illustrated in Figures 8 and 9 the conical extension $k$ is provided with flats $k^2$ in proximity with the slots $f^1$ and the radius $l$ is omitted from the corner of the flange F thus providing a four point seating for each end of each member $g$ two of the points being located at a position equivalent with the position $l^1$ and $l^2$ of Figure 6 and two points being located at $k^3$ and $k^4$.

If so desired the conical extensions $k$ in Figures 1, 2 and 3 may be provided with flats $k^2$ so as to increase the support for the free ends $g^1$ of the members $g$. In all the constructions hereinbefore described it will be seen that accidental dissociation of the members $g$ from the bushes $c$ or $d$, otherwise than by actual fracture, is entirely prevented inasmuch as normal operation of the governor tends to associate the members $g$ more closely with the abutments $f$.

In the construction illustrated in Figures 11 and 12 the bushes $c$ and $d$ are provided with abutments $f$ having an undercut part or notch $i$ and a conical extension $k$ so that the members $g$ having slots $h$ can be associated with the bushes $c$ and $d$ in accordance with this invention and in order to locate the members $g$ in correct relation with the abutments $f$ the bushes $c$ and $d$ are provided with flanges or rings $m$.

Alternately the bushes $c$ and $d$ may be provided with flanges $h$ such as F illustrated in Figures 1, 2, 3 4, 5, 6 and 7 said flanges F having slots $f^1$ or pairs of slots $f^1$ suitable for use with elastic members $g$ having notches $h^1$ (see Figure 10) or slots $h$ (see Figure 4).

It will be seen that by the application of the present invention it is possible to associate the flexible and elastic members $g$ with the fixed and moving bushes c and d without introducing any appreciable stress or distortion of such members g thus enabling each of the members g to function in a similar way thereby improving the performance of the governor as a whole and reducing the risk of fracture of said members.

Inadvertent distortion of the flexible members g by inequalities in the seating surfaces therefor on the fixed bushes c or sliding bushes d on which the said flexible members g are located may also be avoided by removing as much as possible of the seating surfaces so that the extreme ends $g^1$ of the flexible members g are supported by line contact with the bush thus enabling the flexible members g to be mounted on the bushes c and d without the least distortion or deformation other than that purposely introduced by the angular surface on the abutments f.

It will be seen further that in order to dissociate any one of the flexible members g and remove it from the governor it is only necessary to depress the member g at the point $g^2$ (Figure 3) when the free end $g^1$ of the member g rises and can be readily raised further by the finger nail to disengage said member from the abutment f thus enabling the member g to be slipped over the abutment f without difficulty.

It will be obvious that with the construction hereinbefore outlined it is possible to assemble the various parts of the governor with great ease and reliability and that the performance of a number of similar governors manufactured in this way will be substantially identical within the limits permissible with this type of apparatus and further that in the event of one of the flexible members being fractured a new flexible member can be introduced with a minimum of difficulty and with the assurance that the governor when repaired will perform in a manner closely similar to the performance before the damage.

In some instances the ends of the abutments f on the bushes c and d which are in proximity with one another may be provided with angularly disposed surfaces adapted to engage with the upper surface of the flexible member g and depress said member g so as to flex it a predetermined amount when the governor mechanism as a whole is in static position.

I claim:—

1. A centrifugal governor having fixed and sliding bushes of the kind specified, abutments arranged on said bushes, transversely disposed surfaces on the ends of the flexible and elastic members, engaging with said abutments, said abutments maintaining said flexible members in position securely without inadvertently introducing distortion of said members, the free ends of which are supported by a conical surface.

2. A centrifugal governor having fixed and sliding bushes, of the kind specified, abutments arranged on said bushes, transversely disposed surfaces on the ends of the flexible and elastic members, engaging with said abutments, said abutments engaging with a part of the flexible and elastic members and definitely flexing said members a predetermined amount by means of a conical surface which supports the free ends of said members.

3. A centrifugal governor of the kind specified, having fixed and sliding bushes each provided with a flange, each of said flanges having a plurality of pairs of slots isolating projecting parts each of which forms an abutment, transversely disposed surfaces on the end of a flexible and elastic member engaging said abutment to definitely flex said member a predetermined amount by means of a conical surface which supports the free ends of said members.

4. A centrifugal governor of the kind specified, having fixed and sliding bushes, abutments arranged on said bushes, transversely disposed surfaces on the ends of the flexible and elastic members engaging said abutments without inadvertent distortion, the engagement between each abutment and flexible member being effected at four points only.

JAMES HERBERT OFFEN.